United States Patent
Yoshimoto et al.

(10) Patent No.: US 11,710,586 B2
(45) Date of Patent: Jul. 25, 2023

(54) MAGNETIC POWDER

(71) Applicant: NICHIA CORPORATION, Anan (JP)

(72) Inventors: Rieko Yoshimoto, Tokushima (JP); Satoshi Yamanaka, Tokushima (JP); Shuichi Tada, Anan (JP); Hideaki Yoshiwara, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/812,715

(22) Filed: Jul. 14, 2022

(65) Prior Publication Data
US 2022/0351882 A1 Nov. 3, 2022

Related U.S. Application Data

(62) Division of application No. 16/582,614, filed on Sep. 25, 2019, now Pat. No. 11,424,055.

(30) Foreign Application Priority Data

Sep. 26, 2018 (JP) ................. 2018-180239

(51) Int. Cl.
*H01F 1/059* (2006.01)
*C04B 41/00* (2006.01)
*H01F 1/055* (2006.01)
*B05D 3/14* (2006.01)
*B05D 7/24* (2006.01)
*C04B 41/52* (2006.01)
*C04B 41/89* (2006.01)

(52) U.S. Cl.
CPC .......... *H01F 1/0552* (2013.01); *B05D 3/142* (2013.01); *B05D 7/24* (2013.01); *C04B 41/009* (2013.01); *C04B 41/0054* (2013.01); *C04B 41/52* (2013.01); *C04B 41/89* (2013.01); *H01F 1/059* (2013.01)

(58) Field of Classification Search
None
See application file for complete search history.

(56) References Cited

U.S. PATENT DOCUMENTS

| 5,395,459 A | 3/1995 | Pinkerton et al. |
| 2006/0022175 A1 | 2/2006 | Komuro et al. |
| 2012/0145944 A1* | 6/2012 | Komuro .............. C01G 49/009 252/62.51 R |
| 2012/0175986 A1 | 7/2012 | Komuro et al. |
| 2015/0187543 A1 | 7/2015 | Seok et al. |

FOREIGN PATENT DOCUMENTS

| JP | H08111306 A | 4/1996 |
| JP | 2000047802 A | 2/2000 |
| JP | 2000309802 A | 11/2000 |
| JP | 2005286315 A | 10/2005 |
| JP | 2006066870 A | 3/2006 |
| JP | 2007109963 A | 4/2007 |
| JP | 2008069415 A | 3/2008 |
| JP | 2011077223 A | 4/2011 |

OTHER PUBLICATIONS

Machine translation of JP 2008-069415A. (Year: 2008).*
Machida (Chemistry Letters, 1992 p. 1243-1246). (Year 1992).
Machine translation of JP 2000-309802A. (Year: 2000).
Restriction Requirement, issued from the United States Patent and Trademark Office, to U.S. Appl. No. 16/582,614, dated Jul. 19, 2021, 7, pages.
Non-Final Office Action, issued from the United States Patent and Trademark Office, to U.S. Appl. No. 16/582,614, dated Oct. 1, 2021, 6 pages.
Final Office Action, issued from the United States Patent and Trademark Office, to U.S. Appl. No. 16/582,614, filed Jan. 24, 2022, 8 pages.
Notice of Allowance, issued from the United States Patent and Trademark Office, to U.S. Appl. No. 16/582,614, filed Apr. 15, 2022, 8 pages.

* cited by examiner

*Primary Examiner* — Xiaowei Su
(74) *Attorney, Agent, or Firm* — Hunton Andrews Kurth LLP

(57) ABSTRACT

Provided are a SmFeN magnetic powder which is superior not only in water resistance and corrosion resistance but also in hot water resistance, and a method of preparing the powder. The present invention relates to a method of preparing a magnetic powder, comprising: plasma-treating a gas; surface-treating a SmFeN magnetic powder with the plasma-treated gas; and forming a coat layer on the surface of the surface-treated SmFeN magnetic powder.

7 Claims, No Drawings

MAGNETIC POWDER

CROSS-REFERENCE TO RELATED PATENT APPLICATION

This is a divisional application of U.S. patent application Ser. No. 16/582,614, filed Sep. 25, 2019, which claims priority to Japanese Patent Application No. 2018-180239 filed on Sep. 26, 2018. The disclosure of both which are hereby incorporated by reference in their entirety.

BACKGROUND

Technical Field

The present invention relates to a magnetic powder and a method of preparing the powder.

Description of Related Art

SmFeN-based bonded magnets are known as composite materials which may be used in motors for use in aqueous environments such as water pumps. For example, JP 2000-47802 A and JP 2005-286315 A disclose methods of forming a silica film on the surface of an oxidation-susceptible Sm-containing magnetic powder by a sol-gel process.

However, bonded magnets that are superior not only in water resistance and corrosion resistance (oxidation resistance) but also in hot water resistance are required particularly in in-vehicle applications. Merely forming a silica film can improve water resistance and corrosion resistance, but further improvements in hot water resistance are desired.

SUMMARY

The present invention aims to provide a SmFeN magnetic powder which is superior not only in water resistance and corrosion resistance but also in hot water resistance, and a method of preparing the powder.

The present inventors conducted various studies on hot water resistance of SmFeN magnetic powders. As a result, it has been found that not only the water resistance and corrosion resistance but also the hot water resistance of SmFeN magnetic powders can be improved by surface-treating the powders with a plasma-treated gas, and then forming a coat layer thereon. This finding has led to the completion of the present invention.

Specifically, one aspect of the present invention relates to a method of preparing a magnetic powder, the method including: plasma-treating a gas; surface-treating a SmFeN magnetic powder with the plasma-treated gas; and forming a coat layer on a surface of the surface-treated SmFeN magnetic powder.

Another aspect of the present invention relates to a magnetic powder, including: a SmFeN magnetic powder; a plasma-treated layer formed on a surface of the SmFeN magnetic powder; and a coat layer formed on a surface of the plasma-treated layer.

The method of preparing a magnetic powder of the present invention, which includes surface-treating a SmFeN magnetic powder with a plasma-treated gas, and then forming a coat layer thereon, provides magnetic powders which are also superior in hot water resistance.

The magnetic powder of the present invention is a SmFeN magnetic powder which is superior not only in water resistance and corrosion resistance but also in hot water resistance.

DETAILED DESCRIPTION

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved.

A method of preparing a magnetic powder of a present embodiment may include:
plasma-treating a gas;
surface-treating a SmFeN magnetic powder with the plasma-treated gas; and
forming a coat layer on the surface of the surface-treated SmFeN magnetic powder.

The magnetic powder in the present embodiment includes a SmFeN magnetic powder. The SmFeN magnetic powder may be a nitride having a $Th_2Zn_{17}$-type crystal structure and containing the rare earth metal Sm, iron (Fe), and nitrogen (N) as represented by the formula: $Sm_xFe_{100-x-y}N_y$, wherein the value "x" indicating the atomic percentage (%) of the rare earth metal Sm is in the range of 8.1 to 10 (at %); the value "y" indicating the atomic percentage (%) of N is in the range of 13.5 to 13.9 (at %); and the balance is mainly Fe, more typically by $Sm_2Fe_{17}N_3$. SmFeN magnetic powders have stronger magnetic force than that of ferrite magnetic powders, and even relatively small quantities of SmFeN can provide high magnetic force. Moreover, SmFeN magnetic powders have a smaller particle size than that of other rare earth magnetic powders such as NdFeB and SmCo and thus are suitable as filler for the matrix resin. Their another feature is that they are less likely to rust.

The magnetic powder may be a combination of a SmFeN magnetic powder with a NdFeB or SmCo rare earth magnetic powder or a ferrite magnetic powder.

The magnetic powder preferably has an average particle size of 10 μm or less, and the average particle size is more preferably 1 μm or greater and 5 μm or less. With an average particle size of 10 μm or less, defects such as irregularities and cracks are less likely to occur on the surface of the product, and the product has a better appearance. Moreover, a cost reduction can also be achieved. With an average particle size of more than 10 μm, defects such as irregularities and cracks may occur on the surface of the product, resulting in a poor appearance, while with an average particle size of less than 1 μm, the cost of the magnetic powder increases, and thus it is not preferred in view of cost reduction. Herein, the average particle size is defined as the particle size corresponding to the 50th percentile by volume from the smallest particle size in a particle size distribution.

The plasma treatment of a gas may be performed by any method such as vacuum or atmospheric pressure plasma treatment. Among these, atmospheric pressure plasma treatment is preferred in that it eliminates both the need to take time for pressure reduction and the need for large-scale equipment such as vacuum chambers.

Examples of the gas for surface-treating the SmFeN magnetic powder include, but are not limited to, $CF_4$, argon, nitrogen, and air. These may be used alone or in combination. Among these, $CF_4$ is preferred in that it not only enhances adhesion of a silica film, but also will form a fluoride film, resulting in higher resistance to hot water.

It is sufficient that the molar ratio of the amount of the gas used in plasma treatment to the amount of the SmFeN magnetic powder should be 0.005 or greater and 50 or less, preferably 0.05 or greater and 46 or less. When the molar ratio of the amount of the gas is less than 0.005, the plasma treatment tends to produce no effect, while when it exceeds 50, the SmFeN magnetic powder tends to aggregate, resulting in reduced magnetization.

Plasma exposure is performed to surface-treat the SmFeN magnetic powder with the plasma-treated gas. The duration of plasma exposure is not particularly limited, but is preferably one second or longer and 300 seconds or shorter, particularly preferably 10 seconds or longer and 180 seconds or shorter. When the duration of plasma exposure is shorter than one second, the plasma treatment tends to produce no effect, while when it exceeds 300 seconds, the SmFeN magnetic powder tends to aggregate, resulting in reduced magnetization.

The plasma-treated layer thus formed may have any thickness, preferably a thickness of 5 nm or greater and 300 nm or less. When the thickness of the plasma-treated layer is less than 5 nm, the plasma treatment tends to produce no effect, while when it exceeds 300 nm, the SmFeN magnetic powder tends to aggregate, resulting in reduced magnetization.

Any coat layer may be formed on the surface of the surface-treated SmFeN magnetic powder, and examples include metal oxides such as silica, phosphates, alumina, titania, and zinc oxide. Among these, silica is preferred in that it may easily form a film and provide high resistance to oxidation and water.

The formation of a coat layer may be carried out by any method, such as a sol-gel process, liquid phase deposition, thermal oxidation in an oxidation/diffusion furnace, deposition in a thermal CVD system, or deposition in a sputtering system. According to the sol-gel process, a coat layer may be formed by mixing the magnetic powder with an alkyl silicate and then adjusting the mixture with an alkali or acid to an alkaline or acidic pH to cause hydrolysis and condensation of the alkyl silicate.

The alkyl silicate may be a silicate represented by the following formula:

$$Si_nO_{(n-1)}(OR)_{(2n+2)}$$

wherein R represents an alkyl group, and n represents an integer of 1 to 10. The alkyl group may be, for example, methyl, ethyl, propyl, or butyl. The alkyl group is preferably ethyl because of its inexpensive cost and simple handling without toxicity. The value of n, which affects the molecular weight of the alkyl silicate, is preferably in the range of 1 to 10. When n is greater than 10, it is difficult to form a compact silica layer. The amount of the alkyl silicate added is preferably one part by mass or greater and 10 parts by mass or less, more preferably one part by mass or greater and 5 parts by mass or less, depending on, for example, the type of alkyl silicate, and the type, shape, and particle size of the magnetic powder.

The hydrolysis of the alkyl silicate may be carried out in the presence of either a basic or acidic catalyst, preferably of a basic catalyst. It is known that the mechanism of the hydrolysis and condensation reactions of alkyl silicates in basic aqueous solutions is fundamentally different from that in acidic aqueous solutions. In the case of the reactions in basic aqueous solutions, the alkoxy groups of each alkyl silicate are simultaneously replaced with hydroxyl groups. Thus, siloxane bonds grow three-dimensionally from Si to form a silica sol with a condensed network. The basic catalyst may be ammonia, a hydroxide of an alkali metal or alkaline earth metal, or a metal hydroxide which is basic in water. Preferred is ammonia which will fully volatilize without leaving a residue during the subsequent heating step. The hydrolysis and condensation reactions of alkyl silicates in the presence of basic catalysts can take place over a wide range of hydrogen-ion concentrations (pH). In particular, in the present invention, it is preferred to use a basic pH of 7.5 or higher, more preferably a pH in the range of 8 to 13.

The amount of water added for hydrolysis is preferably 0.1 times or greater and 3 times or less, more preferably 0.5 times or greater and 2 times or less, relative to the theoretical amount required for the hydrolysis of the alkyl silicate. When the amount is less than 0.1 times, the hydrolysis tends to be insufficient to form a compact silica thin film, while when it is more than 3 times, the rare earth magnetic powder tends to aggregate, resulting in reduced magnetization.

The coating of the surface of the magnetic powder with the treating agent may be carried out in a high speed shear mixer under dry conditions. The coating may be accomplished by applying a silica sol uniformly to the surface of the magnetic powder while vigorously stirring and dispersing the magnetic powder by the shear force of the mixer, without depending only on the wettability of the silica sol. The oxidation resistance of the resulting silica film is greatly affected by whether a silica sol is distributed as evenly and uniformly as possible in this step.

For this reason, the alkyl silicate may previously be evenly distributed and coated on the magnetic powder, followed by mixing with a basic aqueous solution to achieve a more uniform coating. Mixing conditions may vary depending on the stirring speed, the capacity of the mixer, and the size and shape of the blade, and the conditions should be selected so that each system can be thoroughly and uniformly mixed.

The silica thin film with a three-dimensional network formed on the surface of the rare earth magnetic powder particles may be heated to cause polycondensation of the remaining SiOH groups to stabilize the silica thin film so that it can become a more rigid silica thin film. This treatment is preferably carried out at a temperature of 60 to 250° C., more preferably 100 to 250° C.

The thus prepared silica thin film, when coated at a thickness in the range of 0.01 to 0.5 µm, enhances oxidation resistance without impairing magnetic properties.

A coupling agent may be used to improve wettability between the magnetic powder and the resin and magnet strength. The coupling agent may be selected depending on the type of resin.

A magnetic powder of a present embodiment includes a SmFeN magnetic powder, a plasma-treated layer formed on the surface of the SmFeN magnetic powder, and a coat layer formed on the surface of the plasma-treated layer.

The SmFeN magnetic powder and the coat layer are as described above.

The plasma-treated layer preferably contains fluorine. When $CF_4$ is used as a gas for plasma treatment, the resulting layer will contain fluorine. The fluorine content is not particularly limited, but is preferably 100 ppm or higher and 2000 ppm or lower, more preferably 400 ppm or higher and 1500 ppm or lower. When the fluorine content is lower than 100 ppm, the plasma treatment tends to produce no effect, while when it exceeds 2000 ppm, the SmFeN magnetic powder tends to aggregate, resulting in reduced magnetization.

The magnetic powder of the present embodiment may be mixed with a resin to prepare a bonded magnet composition.

Any resin may be used in the bonded magnet composition, and examples include polypropylene, polyethylene, polyvinyl chloride, polyester, polyamide, polycarbonate, polyphenylene sulfide, and acrylic resins. Among these, polyamide resins are preferred, and polyamide 12 is particularly preferred because it is a crystalline resin having a relatively low melting point and a low water absorption rate, and thus shows good moldability. Moreover, these resins may be used in admixture as appropriate. The amount of the resin is not particularly limited, but is preferably 5 parts by mass or greater and 15 parts by mass or less, more preferably 6 parts by mass or greater and 12 parts by mass or less, per 100 parts by mass of the magnetic powder. An amount of less than 5 parts by mass tends to provide poor moldability, while an amount greater than 15 parts by mass tends to result in lower magnetic properties due to the reduced magnetic powder content.

The bonded magnet may contain components commonly incorporated in bonded magnets, such as antioxidants, heavy metal deactivators, etc. When an antioxidant is incorporated, its amount is preferably 0.01 parts by mass or greater and 5 parts by mass or less per 100 parts by mass of the magnetic powder. An amount of less than 0.01 parts by mass tends to produce almost no antioxidant effect on the binder resin, while an amount greater than 5 parts by mass tends to reduce sliding properties of the melt and to significantly reduce mechanical strength of the bonded magnet.

Such a composite material of the present embodiment may be used in magnets for water pumps for inverters or subradiators, sensors, small motors, and other similar applications.

EXAMPLES

Examples are described below. It should be noted that "%" is by mass unless otherwise specified.

Examples 1 to 7

In each example, 100 g of a $Sm_2Fe_{17}N_3$ magnetic powder having an average particle size of 3 μm was subjected to plasma treatment in an atmospheric pressure plasma generator (microwave output power: 2 kW, exposure area: 100 mm in diameter) using the type of gas, flow rate of the gas, and duration of plasma exposure listed in Table 1.

Next, the plasma-treated $Sm_2Fe_{17}N_3$ magnetic powder was mixed with ethyl silicate (n=5) in a mixer, followed by adding aqueous ammonia adjusted to a pH of 12 and then mixing them for one minute. After completion of the mixing and dispersion, the resulting magnetic powder was taken from the mixer and heated under reduced pressure at 230° C. for 30 minutes to obtain a $Sm_2Fe_{17}N_3$ magnetic powder having a silica thin film formed on the surface thereof.

Comparative Example 1

A $Sm_2Fe_{17}N_3$ magnetic powder having a silica thin film formed on the surface thereof was prepared as in Example 1, except for omitting the plasma treatment.

Comparative Example 2

The magnetic powder of Comparative Example 2 was the plasma-treated $Sm_2Fe_{17}N_3$ magnetic powder obtained in Example 1. No silica thin film was formed on the surface of the magnetic powder of Comparative Example 2.

Comparative Examples 3 and 4

$Sm_2Fe_{17}N_3$ magnetic powders having a silica thin film formed on the surface thereof were prepared as in Example 1, except for changing the order or timing of the plasma treatment step, as indicated in Table 1.

The $Sm_2Fe_{17}N_3$ magnetic powders prepared in the examples and comparative examples were measured for coercive force and fluorine (F) content as described below. Table 1 shows the results.

Coercive Force

The magnetic powders prepared in the examples and comparative examples were left for 200 hours in a constant temperature and humidity chamber at 85° C. and 85% RH and then measured for coercive force using a vibrating sample magnetometer (VSM) with a maximum field of 16 kOe.

F Content

The magnetic powders prepared in the examples and comparative examples were measured by inductively coupled plasma-atomic emission spectroscopy (ICP-AES).

TABLE 1

| | | Atmospheric pressure plasma treatment | | | | | |
|---|---|---|---|---|---|---|---|
| Example No. | Type of gas | Amount of gas [L/min] | Duration of exposure [sec] | Timing | Coat layer | Coercive force [Oe] | F content [ppm] |
| Example 1 | $CF_4 + N_2$ | $CF_4$:0.8 $N_2$:3.2 | 180 | Before coat layer formation | Present | 19300 | 1500 |
| 2 | | | 10 | | | 19400 | 460 |
| 3 | | | 30 | | | 19100 | 700 |
| 4 | | | 50 | | | 19400 | 800 |
| 5 | $N_2$ | 4 | 180 | | | 15400 | 0 |
| 6 | Ar | 4 | 180 | | | 18600 | 0 |
| 7 | Air | 4 | 180 | | | 17000 | 0 |
| Comparative Example 1 | Plasma treatment: Not performed | | | — | Present | 14700 | 0 |
| 2 | $CF_4 + N_2$ | $CF_4$:0.8 $N_2$:3.2 | 180 | | Absent | 13100 | 850 |
| 3 | | | | After coat layer formation | Present | 13700 | 1200 |
| 4 | | | | Simultaneously with coat layer formation | Present | 14000 | 2600 |

Examples 1 to 7 exhibited improved heat resistance as their coercive forces after the constant temperature and humidity test were higher than that of Comparative Example 1 prepared without plasma treatment. Comparative Example 3 in which atmospheric plasma treatment was performed after the formation of a silica coat layer, and Comparative Example 4 in which atmospheric pressure plasma treatment was performed simultaneously with the coat layer formation exhibited no plasma treatment effect.

The magnetic powders and bonded magnet compositions of the present invention having high heat resistance are suitable for use in applications such as water pumps.

What is claimed is:

1. A magnetic powder, comprising:
a SmFeN magnetic powder;
a plasma-treated layer formed on a surface of the SmFeN magnetic powder; and
a coat layer formed on a surface of the plasma-treated layer,
wherein the plasma-treated layer has a thickness that is 5 nm or greater and 300 nm or less.

2. The magnetic powder according to claim 1, wherein the plasma-treated layer contains fluorine.

3. The magnetic powder according to claim 2, wherein the fluorine is present in an amount of 100 ppm or higher and 2000 ppm or lower.

4. The magnetic powder according to claim 2, wherein the fluorine is present in an amount of 400 ppm or higher and 1500 ppm or lower.

5. A bonded magnet composition, comprising:
the magnetic powder according to claim 1; and
a resin.

6. The bonded magnet composition according to claim 5, wherein an amount of the resin is 5 parts by mass or greater and 15 parts by mass or less, per 100 parts by mass of the magnetic powder.

7. The bonded magnet composition according to claim 5, wherein the resin is polyamide 12.

* * * * *